:058,962
Patented Oct. 16, 1962

3,058,962
COAGULATING VINYLIDENE CHLORIDE COPOLYMERS

Alexei Trofimow, Cambridge, Philip K. Isaacs, Brookline, and Donald M. Wacome, Peabody, Mass., assignors to W. R. Grace & Co., Cambridge, Mass., a corporation of Connecticut
No Drawing. Filed Jan. 9, 1959, Ser. No. 785,783
15 Claims. (Cl. 260—87.7)

This invention relates to the coagulation and washing of normally crystalline vinylidene copolymers when produced in the form of aqueous emulsions.

When a normally crystalline vinylidene chloride polymer is produced in aqueous emulsion it has been found difficult to free the polymer after coagulation from the eelctrolyte used to coagulate the emulsion as well as from other impurities. The coagulum is often slimy or pasty or forms big rubbery crumbs and consequently impurities which should be soluble in water are held tenaciously by the coagulum. Such a mass cannot be washed free of eletcrolyte and remaining emulsifier and when dried for use in molding or extrusion operations shows evidence of the impurities in the inferior properties of the molded or extruded articles.

Accordingly it is an object of the present invention to coagulate vinylidene chloride polymers in an improved manner whereby impurities can be readily removed therefrom.

A further object is to coagulate crystalline vinylidene chloride copolymers in a manner that the product can be readily extruded into packaging film.

Yet another object is to control the particle size distribution of the dry vinylidene chloride resin after coagulation.

A still further object is to prepare a coagulated vinylidene chloride copolymer which is practically ash free.

An additional object is to prepare a coagulated vinylidene chloride polymer which is suitable for extrusion without an additional grinding step.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained and an easily washable polymer with desirable particle size distribution, good feed properties and negligible ash content can be separated from a vinylidene chloride copolymer aqueous emulsion by using a two stream coagulation technique and diluted coagulant solutions under controlled temperature condition.

As the copolymer emulsion there can be employed aqueous emulsions of copolymers of 65 to 90% vinylidene chloride and 35 to 10% vinyl chloride, preferably 72 to 80% vinylidene chloride and 20 to 28% vinyl chloride. Likewise there can be used terpolymers of 75 to 80% vinylidene chloride, 15 to 20% vinyl chloride and 5 to 10% of an alkyl acrylate having 8 to 18 carbon atoms in the alkyl group, e.g. a terpolymer of 80% vinylidene chloride, 15% vinyl chloride and 5% 2-ethylhexyl acrylate. Less preferably other vinylidene chloride copolymers can also be used.

It has been found that the particle size of the vinylidene chloride polymer depends on the coagulation temperature. The most suitable particle size is obtained when a cooled vinylidene chloride polymer latex, having a temperature of 0 to 20° C., preferably 6 to 10° C., is stirred simultaneously with a diluted aqueous coagulation solution having a temperature of 5 to 30° C., preferably 20 to 25° C., into a diluted aqueous coagulant solution at 5 to 30° C., preferably 20 to 25° C. For convenience it is preferable that both the diluted coagulant solutions have temperatures of about room temperature. In order to crystalize the coagulated resin the slurry formed is heated up to 60° C. for at least ½ hour and is then centrifuged and washed with warm water.

Solutions of bivalent and trivalent metal salts such as calcium chloride, magnesium chloride, calcium nitrate, aluminum sulfate, barium chloride, aluminum chloride, etc., have been found to be most effective in the coagulation procedure. Aluminum salts are preferred. By decreasing the coagulation temperature to 10° C. or below the separated polymer has a very firm and uniform particle size and extremely high bulk density.

Thus a typical vinylidene chloride vinyl chloride copolymer commercially used to form a heat shrinkage extruded film had a bulk density after drying of about 0.68 when the coagulant slurry temperature was 5° C., a bulk density of 0.60 when the slurry temperature was 10° C., a bulk density of 0.40 when the slurry temperature was 20° C., a bulk density of 0.29 when the slurry temperature was 40° C. and a bulk density of about 0.27 when the slurry temperature was 50° C., all other conditions being identical.

The coagulated vinylidene chloride polymers prepared according to the instant invention can be readily extruded into packaging film. The dry polymers have good feed properties and easily flow from the hopper to the extruder. The coagulated resins also contain only a negligible amount of mineral residue or ash.

In the following examples there were employed copolymers consisting of about 75% vinylidene chloride and 25% vinyl chloride made by the emulsion polymerization technique using dihexyl sodium sulfosuccinate (aerosol MA) as the emulsifier in Examples 1–11 and dodecyl benzene sodium sulfonate (Ultrawet K) Example 12. The latices in Examples 1–12 had total solids content of about 33.5%. In Examples 1–11 the following general procedure was used for the coagulation. 300 parts of the vinylidene chloride copolymer latex and 300 parts of aqueous 0.50% calcium chloride were simultaneously stirred as a thin stream into 300 parts of 0.25% calcium chloride solution. The mixture for stirred for 5 minutes after all the ingredients were added and was then heated to 60° C. and stirred for 30 minutes at 60° C., cooled to 50° C. and centrifuged. The centrifuge cake was washed with 300 parts of demineralized water at 55° C. in four portions and dried at 70° C. until the moisture content was less than 0.1% of the mixture.

Unless otherwise stated all parts and percentages are by weight.

The effect of varying the temperature of the latex and of the coagulant solutions is shown in Examples 1–11 which are presented in table form.

| Example | Temperature, °C., of— Latex | Temperature, °C., of— Coagulant Solution | Slurry Before Graining | Particle Size | Percent Ash | Feed At Extrusion | Bulk Density |
|---|---|---|---|---|---|---|---|
| 1 | 10 | 31 | 26 | Very Coarse, 3-5 mm | .20 | Poor | .32 |
| 2 | 10 | 26 | 22 | Coarse, 2-3 mm | .10 | Fair | .37 |
| 3 | 10 | 25 | 21 | Coarse | .09 | Good | .40 |
| 4 | 10 | 25 | 20 | -----do----- | .06 | ---do--- | .42 |
| 5 | 8 | 21 | 17 | -----do----- | .05 | ---do--- | .46 |
| 6 | 18 | 5 | 10 | Fine Powder | .05 | Fair | .53 |
| 7 | 21 | 8 | 12 | -----do----- | .04 | Poor | .57 |
| 8 | 8 | 8 | 8 | Very Fine Powder | .04 | ---do--- | .60 |
| 9 | 8 | 8 | 8 | -----do----- | .04 | ---do--- | .62 |
| 10 | 6 | 6 | 6 | -----do----- | .04 | ---do--- | .73 |
| 11 | 25 | 55 | No Graining | 3-5 mm | .27 | | .25 |

In Example 11 the latex was added to the warm coagulant.

From the table it can been seen that the best particle size and processing characteristics can be obtained by adding cool latex (8–10° C.) and coagulant at 25° C. simultaneously to dilute coagulant while stirring at room temperature. Coagulating at low temperatures gives much finer particles and a better settling. At 55° C. or above air is entrapped in large clumps which causes some to rise to the top. Serious caking occurs if the coagulum is centrifuged immediately after coagulation. It is necessary to digest the coagulum in the mother liquor, e.g. at 60° C., in order to "grain" the polymer and prevent sticking.

*Example 12*

830 parts of the vinylidene chloride-vinyl chloride copolymer latex at 110° C. and 830 parts of 0.08% aqueous aluminum sulfate at 25° C. were simultaneously stirred into 700 parts of 0.095 aluminum sulfate solution. The slurry temperature was kept at 25° C. and the latex and coagulant were both added at a rate of 2 gal./min. at an agitation speed of 112 to 118 r.p.m. The mixture was then heated slowly to 60° C. and grained for 45 minutes at that temperature. After graining was completed, the slurry was transferred directly to the centrifuge and the cake was washed with 830 parts of demineralized water at 55° C. in four portions and dried at 70° C. until less than 0.1% moisture. The product comprised coarse particles and had a bulk density of 0.42. The polymer was blended with plasticizer and extruded easily into film.

In place of copolymers of vinylidene chloride with vinyl chloride there can be used copolymers of vinylidene chloride and other monoethylenically unsaturated compounds such as acrylonitrile, styrene, vinyl acetate, esters of acrylic acid and esters of methacrylic acid, etc.

What is claimed is:

1. The method of coagulating a normally crystalline vinylidene chloride polymer from an aqueous emulsion thereof comprising adding the aqueous emulsion at a temperature between about 0° C. to 10° C. to an aqueous coagulant salt solution at a temperature between about 20° C. to 30° C.

2. The method according to claim 1 wherein the coagulant solution includes a member of the group consisting of bivalent and trivalent metal salts.

3. The method of coagulating a copolymer of 72 to 80% of vinylidene chloride with 28 to 20% of vinyl chloride from an aqueous latex thereof comprising adding the aqueous latex at a temperature between about 0° C. to 10° C. to an aqueous coagulant solution of a salt selected from the group consisting of bivalent and trivalent metal salts, said aqueous coagulant solution having a temperature between about 20° C to 30° C.

4. A method according to claim 3 wherein the aqueous latex has a temperature of 6 to 10° C., the coagulant solution has a temperature of 20 to 25° C. and includes a calcium salt.

5. A method according to claim 3 wherein the aqueous latex has a temperature of 6 to 10° C., the coagulant solution has a temperature of 20 to 25° C. and includes an aluminum salt.

6. The method of coagulating a normally crystalline vinylidene chloride polymer from an aqueous latex thereof comprising simultaneously adding the latex at a temperature between about 0° C. to 10° C. and an aqueous coagulation solution at a temperature between about 20° C. to 30° C. to an aqueous coagulant salt bath having a temperature between about 20° C. to 30° C.

7. The method according to claim 6 wherein the vinylidene chloride polymer is a copolymer of vinylidene chloride and a copolymerizable monoethylenically unsaturated compound.

8. The method according to claim 6 wherein the vinylidene chloride polymer is a copolymer of 72 to 80% vinylidene chloride with 28 to 20% of vinyl chloride.

9. The method according to claim 8 wherein the coagulation solution and the coagulant bath each contain a salt of the group consisting of bivalent and trivalent metal salts.

10. The method according to claim 8 wherein the latex has a temperature of 6 to 10° C., the coagulation solution and coagulant bath each have a temperature of 20 to 25° C. and the salt is a calcium salt.

11. The method according to claim 10 in which the calcium salt is calcium chloride.

12. The method according to claim 10 in which the calcium salt is calcium nitrate.

13. The method according to claim 8 wherein the latex has a temperature of 6 to 10° C., the coagulation solution and coagulant bath each have a temperature of 20 to 25° C. and the salt is an aluminum salt.

14. The method according to claim 13 wherein the aluminum salt is aluminum sulfate.

15. A method according to claim 1 wherein the coagulant solution has a temperature of from about 20° C. to about 25° C.

References Cited in the file of this patent

UNITED STATES PATENTS

| | | |
|---|---|---|
| 2,530,362 | Morris | Nov. 14, 1950 |
| 2,921,046 | Arlman | Jan. 12, 1960 |